May 26, 1925. 1,538,998
C. L. MICHOD
VEHICLE STAY BLOCK
Filed Feb. 8, 1924
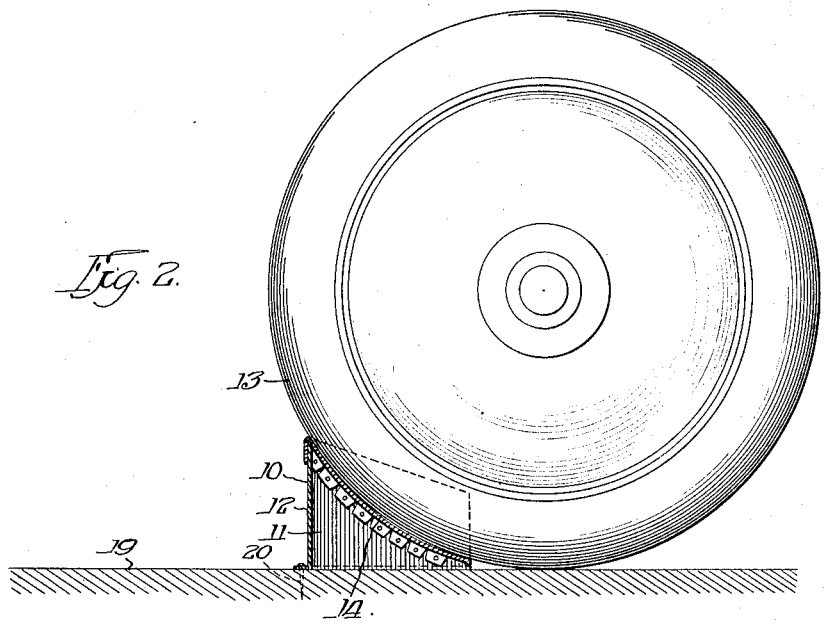
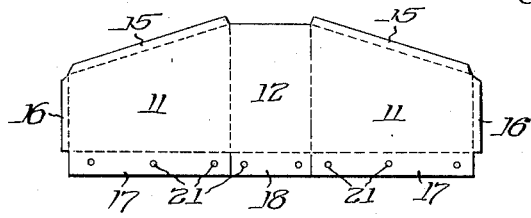
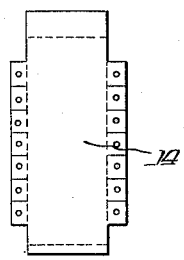
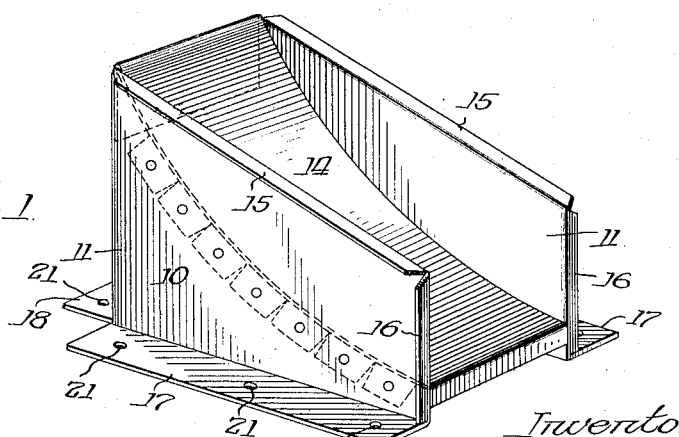
Witness:
Inventor
Charles L. Michod
By Ernest C. Tupes Atty.

Patented May 26, 1925.

1,538,998

UNITED STATES PATENT OFFICE.

CHARLES L. MICHOD, OF CHICAGO, ILLINOIS, ASSIGNOR, BY MESNE ASSIGNMENTS, TO E. S. EVANS & COMPANY, INCORPORATED, OF DETROIT, MICHIGAN, A CORPORATION OF DELAWARE.

VEHICLE STAY BLOCK.

Application filed February 8, 1924. Serial No. 691,339.

*To all whom it may concern:*

Be it known that I, CHARLES L. MICHOD, a citizen of the United States, and resident of Chicago, in the county of Cook and State of Illinois, have invented certain new and useful Improvements in Vehicle Stay Blocks, of which the following is a specification.

The invention relates to stay blocks for vehicles and more particularly to blocks which are adapted to be fastened to the floor of a freight car or a boat, in which the vehicles are being shipped, with the block so constructed as to bear against a portion of the tire of the vehicle wheel in a manner to prevent movement of the vehicle in the direction of the block.

One of the objects of the invention is to provide a block which by reason of its configuration and reinforcement is adapted to be made from relatively thin material such as sheet metal and yet be sufficiently strong to withstand the shocks to which it is subjected without buckling or crushing.

Another object is to provide a block which can be easily and cheaply constructed from a minimum number of parts by stamping or cutting the parts from plates or sheets of the material of construction and then bending the parts to the required shape and fastening the parts together.

A further object is to provide a strong durable block which, by reason of its light weight, can be shipped back to the vehicle factory at such a low freight charge as to render its repeated use economical.

A still further object is to provide a block which minimizes the tendency of the wheel to roll over the block.

Still another object is to provide a block which does not chafe or mar the tire of the wheel against which it operates.

These and other objects will be more fully set forth and described in the following specification and shown in the accompanying drawings in which:

Fig. 1 is a perspective view of the device;

Fig. 2 is a longitudinal sectional view through the device in position against a wheel;

Fig. 3 is a plan view of a plate from which the exterior walls of the device are formed; and Fig. 4 is a plan view of a plate forming a portion of the device.

The device comprises an oblong box open at one end as shown in Fig. 1. The box is generally designated by the numeral 10 and has a pair of side walls 11 connected by a front end wall 12. The walls 11 are spaced apart sufficiently to receive a portion of a tire 13 of the wheel of an automobile against which the device is positioned to prevent movement of the wheel in the direction of the block or device. A transverse member 14 mounted in the box 10 presses against the tire 13 and serves as a stop to limit the movement of the automobile on which the tire is mounted.

The member 14 has substantially the same radius of curvature as the tire 13 and is tilted slightly downwardly at the rear to cause the tire to initially contact with the member 14 at a point adjacent the front end wall 12. The height of the box 10 and the adjacent initial point of contact with the tire is preferably approximately one half the radius of the tire. The height of the rear end of the tire contacting surface of the member 14 may be advantageously arranged to suit the diameter of the tire and the weight of the vehicle. In practice an elevation of approximately two inches has been found to work well with automobiles of average weight and wheel base.

The side walls 11 slope downwardly to the rear, as a saving in material is thereby accomplished, and their utility to prevent lateral movement of the tire is not diminished by this construction. Outwardly extending flanges 15 and 16 are provided for the top and end edges respectively of the side walls 11 to increase their rigidity. The lower edges of the walls 11 and 12 are provided with the outwardly extending flanges 17 and 18 respectively. The flanges 17 and 18 add to the stiffness of the lower portion of the device and provide means for fastening to the floor 19 by nails or screws 20 which are driven through holes 21 in the flanges.

The transverse member 14 extends over the upper edge of the end wall 12 and downwardly on the outside a substantial distance and is fastened to the wall by riveting or spot welding. The downwardly extending portion of the member 14 reinforces and stiffens the end wall 12. The lateral edges of the member 14 are turned downwardly and fastened to the side walls 11 by riveting or by spotwelding, thereby stiffening the side walls and minimizing any tendency to buckle which might be caused by a sudden thrust from the automobile wheel. The rear edge of the member 14 is provided with a downwardly turned flange to add to its rigidity and to give it a finished appearance.

The box 10 is constructed preferably from a single sheet of metal stamped or cut to the outline as shown in Fig. 3 and the transverse member 14 is likewise formed from a sheet of metal cut to the outline shown in Fig. 4. In these views the solid lines indicate bounding edges of the material and the dotted lines are those along which the material is bent angularly in its final assembled form.

In operation each wheel of the vehicle is preferably equipped with one of the devices fastened to the floor of the car with the upper portion of the member 14 bearing against the tire and the rear lower end of the member slightly spaced therefrom. This arrangement prevents the member 14 from acting as a wedge over which the wheel could roll and ride over the block. The yielding of the tire at the initial point of contact permits a limited amount of thrust from the tire to be distributed over the entire member 14. The amount of this thrust diminishes towards and becomes zero at the lower end of the member 14 as a result of the divergence between the tire and the member. Each rear wheel of the vehicle may be provided with a device placed in front as shown in Fig. 2 and the front wheels each with a device positioned to bear against the rear of the wheel in a similar manner. The devices might also be positioned in the rear of the rear wheels and in the front of the front wheels if preferred. By either of these arrangements, it is obvious that the blocks will prevent movement of the vehicle relative to the car in which it is being shipped.

By reason of the connection of the member 14 to the side walls 11 in the manner shown only the lower portion of the walls 11 are subjected to compression except near the front end where the connection to the end wall 12 adds to its stiffness and rigidity. The bent down portion of the member 14 over the end wall acts as a stiffener to the end wall which is also under compression from the wheel thrust. Since the tendency of a plate to buckle depends upon its unsupported depth between stiffeners it is obvious that the arrangement of the member 14 and its connection to the walls of the device is a highly important feature in minimizing any tendency of the walls to buckle.

On account of the compactness of the block and its reinforcement against buckling by means of the flanges and the connections between the parts, number 16 gage metal is found to be sufficiently strong to withstand the shocks to which it is subjected and the weight of a block suitable for use with automobiles of average weight and size of wheels need not exceed three pounds. The method of constructing and assembling the parts of thin material adapts the device to low cost and quantity production and notwithstanding its low first cost, its weight and bulk is such as to permit its return to the shipper at a freight cost low enough to effect economies justifying its repeated use.

I claim:

1. In a device of the class described, a box shaped member having its top and one end open, means adapted to fasten said member to a floor, and a transverse member connecting the side walls of the member and forming, with the open ends of the side walls, a receptacle adapted to receive a portion of a vehicle wheel when the wheel stands in upright position on the floor.

2. In a device of the class described, a box shaped member having its top and one end open, means adapted to fasten said member to a floor, a transverse member connecting the side walls of the box shaped member and forming with the portion of the side walls adjacent the open end, a receptacle adapted to receive a portion of a vehicle wheel standing in upright position on the floor, said transverse member being positioned to initially engage the tire of the wheel at a substantial distance from the floor and to slightly diverge downwardly from the tire.

3. In a device of the class described, a box shaped member having one end closed and its top and the other end open, means adapted to fasten said member to a floor, and a transverse member connecting the side walls of the box shaped member, and extending downwardly from the upper edge of the closed end of the box shaped member to approximately the opposite lower end of said box shaped member thereby forming, with the portion of the side walls adjacent the open end, a receptacle adapted to receive a portion of a vehicle wheel standing on the floor, said transverse member being so positioned as to initially engage the tire of the wheel at a point adjacent the upper edge of the closed end of the box shaped member.

4. In a device of the class described, a box shaped member having its top and one end open, means for fastening said member to a floor, and an arcuate member connecting the side walls of the box shaped member and forming, with the open ends of said side walls, a receptacle adapted to receive a portion of a vehicle wheel in position on the floor.

5. In a device of the class described, a box shaped member having its top and one end open, means for fastening said member to a floor, and an arcuate member connecting the side walls of the box shaped member and forming, with the open end of said side walls, a receptacle adapted to receive a portion of a vehicle wheel in position on the floor, said arcuate member being substantially concentric with the axis of the wheel when the tire of the wheel initially engages said arcuate member.

6. In a device of the class described, a box shaped member having its top and one end open, means for fastening said member to a floor, and an arcuate member connecting the side walls of the box shaped member and forming with the open ends of said side walls, a receptacle adapted to receive a portion of a vehicle wheel in position on the floor, the radius of curvature of the wheel and of the arcuate member being substantially equal, and said arcuate member being so positioned that its center of curvature is slightly below the center of the wheel when said wheel and arcuate member initially engage.

7. In a device of the class described, a box shaped member having its top and one end open, and an arcuate member connecting the side walls of the box shaped member, said arcuate member being concave towards the open end of said box shaped member.

8. In a device of the class described, a box shaped member having one end closed and its top and the other end open, means adapted to fasten the device to a floor, and an arcuate member extending from the upper edge of the closed end of said box shaped member to substantially the lower edge of the open end of the box shaped member, said arcuate member having its lateral edges fastened to the side walls of the box shaped member and an extension on its upper end turned downwardly and fastened to the closed end of the box shaped member.

Signed at Chicago, Ill., this 6th day of February, 1924.

CHARLES L. MICHOD.